United States Patent

[11] 3,609,156

[72] Inventors Hideaki Munakata;
Kazuo Watanabe; Yoshikazu Arimatsu; Masakazu Tanaka, all of Otsu-shi, Japan
[21] Appl. No. 2,404
[22] Filed Jan. 12, 1970
[45] Patented Sept. 28, 1971
[73] Assignee Toyo Boseki Kabushiki Kaisha
Osaka-shi, Osaka-fu, Japan
[32] Priority Jan. 18, 1969
[33] Japan
[31] 44/3557

[54] PROCESS FOR PREPARING 1,3-PROPANEDIOL DERIVATIVES
4 Claims, No Drawings

[52] U.S. Cl................................................. 260/294.7,
260/326.5, 260/570.5, 260/584, 260/333
[51] Int. Cl............................................... C07d 29/16
[50] Field of Search............................................ 260/584,
570.5, 294.7 R, 294.7 M, 326.5 N, 326.5 M

[56] References Cited
OTHER REFERENCES
JACS, vol. 76: 2789– 2790 (1954), Searles et al.

*Primary Examiner*—Henry R. Jiles
*Assistant Examiner*—S. D. Winters
*Attorney*—Wenderoth, Lind & Ponack

ABSTRACT: Process for preparing 1,3-propanediol derivatives which comprises reacting an oxetane compound of the formula:

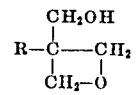

wherein R is a lower alkyl group substituted or not with halogen, aryl, hydroxyl, lower alkoxy or aryloxy with an amine of the formula:

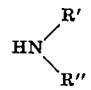

wherein R' is a hydrogen atom, a lower alkyl group or a cycloalkyl group and R'' is a lower alkyl group or a cycloalkyl group or, when taken together with the adjacent nitrogen atom, they represent a nitrogen containing saturated heterocyclic group in the presence of a phenol to give a 1,3-propanediol compound of the formula:

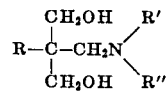

wherein R, R' and R'' are each as defined above.

PROCESS FOR PREPARING 1,3-PROPANEDIOL DERIVATIVES

The present invention relates to a process for preparing 1,3-propanediol derivatives. More particularly, it relates to an improved process for preparing 1,3-propanediol derivatives from oxetane derivatives.

The ring-opening reaction of ethylene oxide and its derivatives with primary or secondary amines is well known. Different from an epoxy ring, however, an oxetane ring is hardly opened with primary or secondary amines. Particularly when the amine used for the opening is a secondary amine bearing a relatively bulky substituent, the reaction rate is markedly low. Although the presence of water or an alcohol in the reaction system is somewhat effective in improving the reaction rate, such improvement effect is insufficient and unsatisfactory in case of using a bulky substituent-bearing secondary amine as the reactant.

It has now been found that the oxetane ring in oxetane derivatives can be quite easily opened with primary or secondary amines in the presence of phenols to afford 1,3-propanediol derivatives in much higher yields, compared with the ring opening in the absence of phenols. This finding is particularly appreciable in providing the advantageous effect even when a bulky substituent-bearing secondary amine is used. In view of the previous knowledge that acid catalysts have no effect in accelerating the ring-opening reaction of this kind [S. Searles et al.: J.Am.Chem.Soc., 76, 2789 (1954)], the above finding is of surprising and unexpected nature. In addition, the use of phenols is advantageous in preventing the byproduction of colored impurities as otherwise produced and hardly removable and yielding the colorless reaction product being highly pure.

Thus, the present invention is concerned with a process for preparing 1,3-propanediol derivatives which comprises reacting an oxetane compound of the formula:

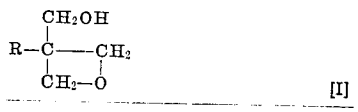

wherein R is a lower alkyl group (e.g., methyl, ethyl, propyl, isopropyl, butyl) substituted or not with halogen (e.g., chlorine, bromine), aryl (e.g., phenyl, tolyl), hydroxyl, lower alkoxy (e.g., methoxy, ethoxy, propoxy, butoxy) or aryloxy (e.g., phenyloxy, tolyloxy) with an amine of the formula:

wherein R' is a hydrogen atom, a lower alkyl group (e.g., methyl, ethyl, propyl, butyl, pentyl) or a cycloalkyl group (e.g., cyclopentyl, cyclohexyl) and R" is a lower alkyl group (e.g., methyl, ethyl, propyl, butyl, pentyl) or a cycloalkyl group (e.g., cyclopentyl, cyclohexyl) or, when taken together with the adjacent nitrogen atom, they represent a nitrogen-containing saturated heterocyclic group (e.g., pyrrolidino, piperidino) in the presence of a phenol to give a 1,3-propanediol compound of the formula:

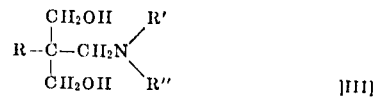

wherein R, R' and R" are each as defined above.

As the phenol, there may be used, for instance, monohydric phenols (e.g., phenol, cresol, xylenol), polyhydric phenols (e.g., catechol, resorcinol, hydroquinone, pyrogallol), electronegative atom or group-bearing phenols (e.g., monochlorophenol, dichlorophenol, trichlorophenol, mononitrophenol, dinitrophenol, picric acid), etc.

The amine [II] is ordinarily employed in an equimolar amount or in slightly excess to the oxetane compound [I]. The use of the amine [II] in much excess may rather result in depression of the reaction rate. The larger amount of the phenol generally makes the reaction rate and the yield higher, but its use in too excess will cause troubles in recovery of the reaction product and the catalysts and is not economical. Normally, the use of 0.3 to 1.5 mol of the phenol per mol of the oxetane compound [I] is favored. Even when used in a smaller amount, i.e., about 0.01 to 0.1 mol, it is still effective somewhat for acceleration of the reaction, particularly for prevention of the reaction product from contamination with hardly removable, colored impurities.

The reaction temperature may be usually from 150° to 230° C. Higher temperatures (i.e., about 250° C. or higher) are not favorable because of the proceeding of side-reactions such as polymerization and decomposition, although a higher reaction rate is attained with elevation of the reaction temperature.

As mentioned above, water or an alcohol can accelerate the reaction rate in certain cases and may be also presented in the reaction system.

The 1,3-propanediol derivatives prepared by the process of this invention are useful as the materials for improving the dyeability of linear polyesters with acid dyes. For instance, they are polycondensed with dicarboxylic acids in manners as conventionally employed for the production of polyesters. The resultant polymers possess excellent dyeability with acid dyes and are used as such or for blending into other polyesters.

Practical and presently preferred embodiments of the present invention are illustratively shown in the following examples.

EXAMPLE 1

In a 500 ml. volume autoclave, 3-hydroxymethyl-3-methyloxetane (102 g.), diethylamine (110 g.) and phenol (94 g.) are charged, and the atmosphere is replaced by nitrogen gas. The autoclave is heated to 200° C. while stirring and maintained at the temperature for 16 hours. After cooling to room temperature, the reaction mixture is taken out and fractionally distilled whereby unreacted diethylamine and phenol are recovered under atmospheric pressure, unreacted oxetane is recovered under reduced pressure and then 2-methyl-2-diethylaminomethyl-1,3-propanediol (145 g.) boiling at 93° to 95° C./0.4 mm. Hg is obtained. The product is shaken with 1 percent aqueous sodium hydroxide solution (300 ml.) to eliminate contaminating phenol, extracted with ether and then concentrated. The resulting material is pure 2-methyl-2-diethylaminomethyl-1,3-propanediol.

Some of the 1,3-propanediol compounds [III] obtained by reacting the oxetane compounds [I] with the amines [II] in the same manner as above are shown in the following table:

TABLE 1

| Starting material | | | | Product | | |
|---|---|---|---|---|---|---|
| Oxetane | Grams | Amine | Grams | 1,3-propanediol | Boiling point, °C. | Yield, g. |
| $HOCH_2\diagdown_C\diagup CH_2\diagdown_O$ $H_3C\diagup\phantom{_C}\diagdown CH_2\diagup$ | 102 | $HN\diagup^{C_2H_5}\diagdown_{C_2H_5}$ | 110 | $HOCH_2\diagdown_C\diagup CH_2OH$ $H_3C\diagup\phantom{_C}\diagdown CH_2N(C_2H_5)_2$ | [1] 93–95 | 145 |
| Same as above | 102 | $HN\diagup^{n-C_3H_7}\diagdown_{n-C_3H_7}$ | 152 | $HOCH_2\diagdown_C\diagup CH_2OH$ $H_3C\diagup\phantom{_C}\diagdown CH_2N(C_3H_7)_2$ | [2] 94–96 | 166 |
| Do | 102 | $HN\diagup^{n-C_4H_9}\diagdown_{n-C_4H_9}$ | 194 | $HOCH_2\diagdown_C\diagup CH_2OH$ $H_3C\diagup\phantom{_C}\diagdown CH_2N(C_4H_9)_2$ | [2] 113 | 170 |
| Do | 102 | $\langle H \rangle-NH_2$ | 149 | $HOCH_2\diagdown_C\diagup CH_2OH$ $H_3C\diagup\phantom{_C}\diagdown CH_2NH-\langle H \rangle$ | [2] 147 | 191 |
| $HOCH_2\diagdown_C\diagup CH_2\diagdown_O$ $H_5C_2\diagup\phantom{_C}\diagdown CH_2\diagup$ | 116 | $HN\diagup^{n-C_3H_7}\diagdown_{n-C_3H_7}$ | 152 | $HOCH_2\diagdown_C\diagup CH_2OH$ $H_5C_2\diagup\phantom{_C}\diagdown CH_2N(C_3H_7)_2$ | [3] 107–108 | 173 |
| $HOCH_2\diagdown_C\diagup CH_2\diagdown_O$ $HOCH_2\diagup\phantom{_C}\diagdown CH_2\diagup$ | 118 | $HN\diagup^{C_2H_5}\diagdown_{C_2H_5}$ | 110 | $HOCH_2\diagdown_C\diagup CH_2OH$ $HOCH_2\diagup\phantom{_C}\diagdown CH_2N(C_2H_5)_2$ | [2] 143 | 143 |

[1] 0.4 mm. Hg.  [2] 0.1 mm. Hg.  [3] 0.2 mm. Hg.

EXAMPLE 2

A mixture of 3-hydroxymethyl-3-methyloxetane (1.0 mol) and the amine [II] (1.5 mol) incorporated with or without phenol (1.0 mol) is heated at 200° C. for 16 or 2.5 hours. The yield of the produced 1,3-propanediol compound [III] is determined by gas chromatography. The results are shown in the following table:

TABLE 2

| Amine | Phenol | Reaction time (hrs.) | Yield based on oxetane (percent) |
|---|---|---|---|
| $HN\diagup^{n-C_4H_9}\diagdown_{n-C_4H_9}$ | Added | 16 | 74 |
| | Not added | 16 | 3 |
| $HN\diagup^{n-C_3H_7}\diagdown_{n-C_3H_7}$ | Added | 16 | 81 |
| | Not added | 16 | 12 |
| $HN\diagup^{C_2H_5}\diagdown_{C_2H_5}$ | Added | 16 | 85 |
| | Not added | 16 | 18 |
| $HN\diagup^{CH_2-CH_2}\diagdown_{CH_2-CH_2}\!\!CH_2$ | Added | 16 | 100 |
| | Not added | 16 | 86 |
| | Added | 2.5 | 95 |
| | Not added | 2.5 | 39 |
| $H_2N-n-C_4H_9$ | Added | 16 | 100 |
| | Not added | 16 | 83 |
| | Added | 2.5 | 100 |
| | Not added | 2.5 | 33 |
| $H_2N-C(CH_3)_3$ | Added | 16 | 90 |
| | Not added | 16 | 32 |
| $\langle H \rangle-NH_2$ | Added | 16 | 100 |
| | Not added | 16 | 66 |
| | Added | 2.5 | 78 |
| | Not added | 2.5 | 4 |

EXAMPLE 3

A certain amount of the phenol as the catalyst is added to 3-hydroxymethyl-3-methyloxetane (1.0 mol) and diethylamine (1.5 mol), and the resultant mixture is heated at 200° C. for 2 hours. The yield (percent based on oxetane) of the produced 2-methyl-2-diethylaminomethyl-1,3-propanediol is determine by gas chromatography. The results are shown in the following table:

TABLE 3

| Catalyst: | Amount of catalyst (mol) | | | | |
|---|---|---|---|---|---|
| | ¼ | ½ | 1 | 1.5 | 3 |
| Pyrogallol | 77 | 89 | 98 | | |
| Catechol | 42 | 66 | 84 | 94 | 98 |
| Resorcinol | 33 | 45 | 79 | 92 | |
| Hydroquinone | 27 | 36 | 61 | 82 | 90 |
| Phenol | 16 | 21 | 30 | 34 | 44 |
| o-Cresol | 8 | 13 | 16 | 22 | 28 |
| m-Cresol | 9 | 21 | 31 | 34 | 39 |
| p-Cresol | 16 | 17 | 28 | 30 | 33 |
| 2,6-xylenol | 8 | 8 | 9 | | |
| 2,4-xylenol | 11 | 12 | 15 | | |
| 3,5-xylenol | 8 | | | | |
| p-Chlorophenol | 22 | 26 | 40 | | |
| 2,4,6-trichlorophenol | 26 | 34 | | | |
| o-Nitrophenol | 14 | 18 | 19 | | |
| p-Nitrophenol | 38 | 52 | 86 | | |
| 2,4-dinitrophenol | 21 | | | | |
| Picric acid | 9 | | | | |
| Not added | Trace | | | | |

EXAMPLE 4

In the presence of phenol (1.0 mol), 3-hydroxymethyl-3-methyloxetane (1.0 mol) is reacted with a certain amount of diethylamine at 200° C. for 14 hours. The yield of the produced 2-methyl-2-diethylaminomethyl-1,3-propanediol is determined by gas chromatography. The results are shown in the following table:

Table 4

| Amount of Diethylamine (mol) | Yield based on oxetane (%) |
| --- | --- |
| 0.35 | 28 |
| 1.06 | 81 |
| 1.39 | 83 |
| 1.74 | 83 |
| 2.61 | 77 |
| 3.47 | 60 |
| 5.21 | 26 |

Example 5

In the presence of phenol (1.0 mol), 3-hydroxymethyl-3-ethyloxetane (1.0 mol) is reacted with diethylamine (1.5 mol) at a certain temperature for a certain period of time. The yield of the produced 2-ethyl-2-diethylaminomethyl-1,3-propanediol is determined by gas chromatography. The results are shown in the following table:

Table 5

| Reaction temperature (°C.) | Reaction time (Hrs.) | Yield based on oxetane (%) |
| --- | --- | --- |
| 100 | 48 | 8 |
| 150 | 16 | 47 |
| 200 | 16 | 83 |

EXAMPLE 6

In the presence of a certain amount of phenol, 3-hydroxymethyl-3-methyloxetane (102 g., 1 mol) is reacted with diethylamine (73 g., 1 mol) at 210° C. for 16 hours. The yield and coloration of the produced 2-methyl-2-diethylaminomethyl-1,3-propanediol after distillation are shown in the following table:

Table 6

| Amount of phenol (mol) | Yield (%) | Coloration |
| --- | --- | --- |
| 0 | 48.7 | Yellow to brown |
| 0.0125 | 50.7 | None |
| 0.05 | 61.4 | None |
| 0.10 | 77.4 | None |
| 0.30 | 85.0 | None |

EXAMPLE 7

An oxetane compound is retracted with an equimolar amount of diethylamine in the presence of an equimolar amount of phenol at 200° C. for 16 hours. The yield of the produced 1,3-propanediol compound is determined by gas chromatography. The results are shown in table 7:

TABLE 7

| Oxetane | Product | Yield (percent) |
| --- | --- | --- |
| 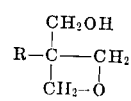 | HOCH$_2$ \ / CH$_2$N(C$_2$H$_5$)$_2$ C H$_3$COCH$_2$ / \ CH$_2$OH | 72 |
|  | HOCH$_2$ \ / CH$_2$N(C$_2$H$_5$)$_2$ C (phenyl)OCH$_2$ / \ CH$_2$OH | 50 |
| 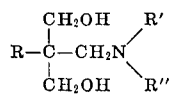 | HOCH$_2$ \ / CH$_2$N(C$_2$H$_5$)$_2$ C ClCH$_2$ / \ CH$_2$OH | 68 |

What is claimed is:

1. A process for preparing 1,3-propanediol derivatives which comprises reacting an oxetane compound of the formula:

$$R-\underset{\underset{CH_2-O}{|}}{\overset{\overset{CH_2OH}{|}}{C}}-CH_2$$

wherein R is a lower alkyl group substituted or not with halogen, aryl, hydroxyl, lower alkoxy or aryloxy with an amine of the formula:

$$HN\begin{matrix}R'\\ \diagdown\\ R''\end{matrix}$$

wherein R' is a hydrogen atom, a lower alkyl group or a cycloalkyl group and R'' is a lower alkyl group or a cycloalkyl group or, when taken together with the adjacent nitrogen atom, they represent a nitrogen-containing saturated heterocyclic group in the presence of a phenol to give a 1,3-propanediol compound of the formula:

$$R-\underset{\underset{CH_2OH}{|}}{\overset{\overset{CH_2OH}{|}}{C}}-CH_2N\begin{matrix}R'\\ \diagdown\\ R''\end{matrix}$$

wherein R, R' and R'' are each as defined above.

2. The process according to claim 1, wherein the phenol is the one selected from the group consisting of monohydric phenols, polyhydric phenols and electronegative atom or group-bearing phenols.

3. The process according to claim 1, wherein the reaction is effected at a temperature from 150° to 230° C.

4. The process according to claim 1, wherein the phenol is used in 0.01 to 1.5 mol per mol of the oxetane compound.